US006779571B1

(12) United States Patent
Kasparov

(10) Patent No.: US 6,779,571 B1
(45) Date of Patent: Aug. 24, 2004

(54) TIRE WITH REMOVABLE STUDS

(76) Inventor: Aram A. Kasparov, 1105 SW. 66th, #3311, Portland, OR (US) 97225

( * ) Notice: Subject to any disclaimer, the term of this patent is extended or adjusted under 35 U.S.C. 154(b) by 261 days.

(21) Appl. No.: 10/136,629

(22) Filed: May 2, 2002

(51) Int. Cl.[7] ............................................... B60C 11/16
(52) U.S. Cl. ...................................... 152/210; 152/902
(58) Field of Search ................................ 152/208, 210, 152/209.18, 902; D12/608

(56) References Cited

U.S. PATENT DOCUMENTS

| 3,212,549 A | * | 10/1965 | Lennart .................... 152/210 |
| 3,237,670 A | * | 3/1966 | Hutchinson ................ 152/211 |
| 4,809,756 A | * | 3/1989 | Takahashi ................... 152/210 |
| 5,203,933 A | * | 4/1993 | Nagahisa ................ 152/209.15 |
| 5,582,496 A | * | 12/1996 | Ambrico et al. ............ 411/432 |
| 2002/0092591 A1 | * | 7/2002 | Cortes ................... 152/209.18 |

FOREIGN PATENT DOCUMENTS

| GB | 2177 | * | 12/1907 |
| JP | 2-182506 | * | 7/1990 |

OTHER PUBLICATIONS

Webster's II New Riverside University Dictionary, p. 1205, 1984.*

* cited by examiner

Primary Examiner—Steven D. Maki

(57) ABSTRACT

A tire with removable studs for allowing tires to be used year round. The tire with removable studs includes a tire member having an exterior circumferential surface and further having a plurality of boss members being spacedly and integrally disposed upon the exterior circumferential surface; and further includes a plurality of stud-fastening members being securely disposed in the tire member; and also includes a plurality of stud members being removably disposed in the stud-fastening members and extended from the tire member for gripping a road surface.

4 Claims, 3 Drawing Sheets

TIRE WITH REMOVABLE STUDS

BACKGROUND OF THE INVENTION

1. Field of the Invention

The present invention relates to stud/stud-less tires and more particularly pertains to a new tire with removable studs for allowing tires to be used year round.

2. Description of the Prior Art

The use of stud/stud-less tires is known in the prior art. More specifically, stud/stud-less tires heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat Nos. 4,921,030; 5,198,048; 4,619,301; 4,875,515; 857,745; and Des. 431,215.

While these devices fulfill their respective, particular objectives and requirements, the aforementioned patents do not disclose a new tire with removable studs. The prior art includes inventions having sleeves permanently inserted into the tire members and used for gripping a road surface.

SUMMARY OF THE INVENTION

The general purpose of the present invention, which will be described subsequently in greater detail, is to provide a new tire with removable studs which has many of the advantages of the stud/stud-less tires mentioned heretofore and many novel features that result in a new tire with removable studs which is not anticipated, rendered obvious, suggested, or even implied by any of the prior art stud/stud-less tires, either alone or in any combination thereof. The present invention includes a tire member having an exterior circumferential surface and further having a plurality of boss members being spacedly and integrally disposed upon the exterior circumferential surface; and further includes a plurality of stud-fastening members being securely disposed in the tire member; and also includes a plurality of stud members being removably disposed in the stud-fastening members and extended from the tire member for gripping a road surface. None of the prior art describes inventions having stud members removably inserted in the tire members to allow the use of the tire members year round.

There has thus been outlined, rather broadly, the more important features of the tire with removable studs in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new tire with removable studs which has many of the advantages of the stud/stud-less tires mentioned heretofore and many novel features that result in a new tire with removable studs which is not anticipated, rendered obvious, suggested, or even implied by any of the prior art stud/stud-less tires, either alone or in any combination thereof.

Still another object of the present invention is to provide a new tire with removable studs for allowing tires to be used year round.

Still yet another object of the present invention is to provide a new tire with removable studs that is easy and convenient to install and use.

Even still another object of the present invention is to provide a new tire with removable studs that eliminates the user from having to have two sets of tires one for winter and one for summer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
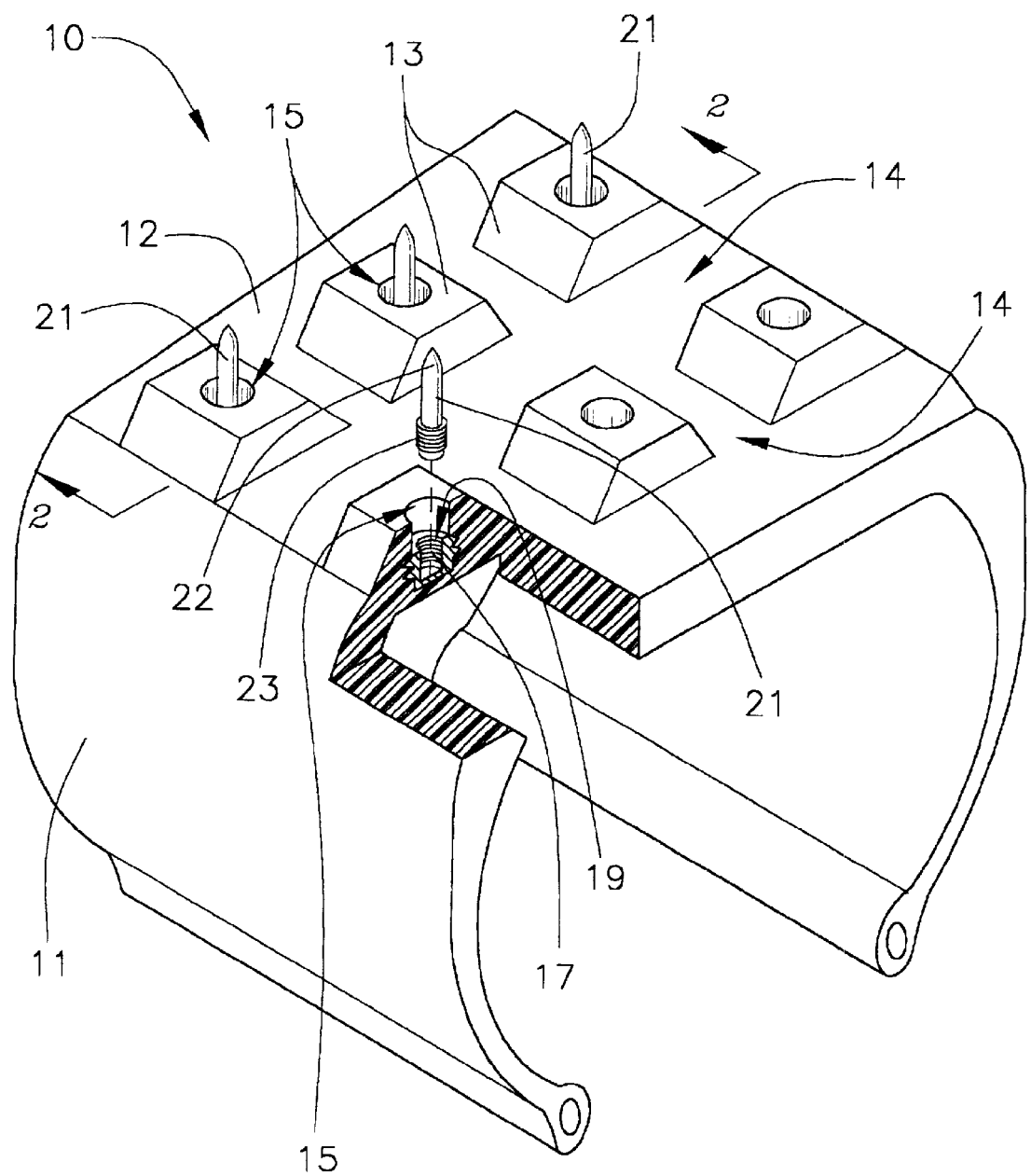
FIG. 1 is a perspective view of a new tire with removable studs according to the present invention.
Figure 2:
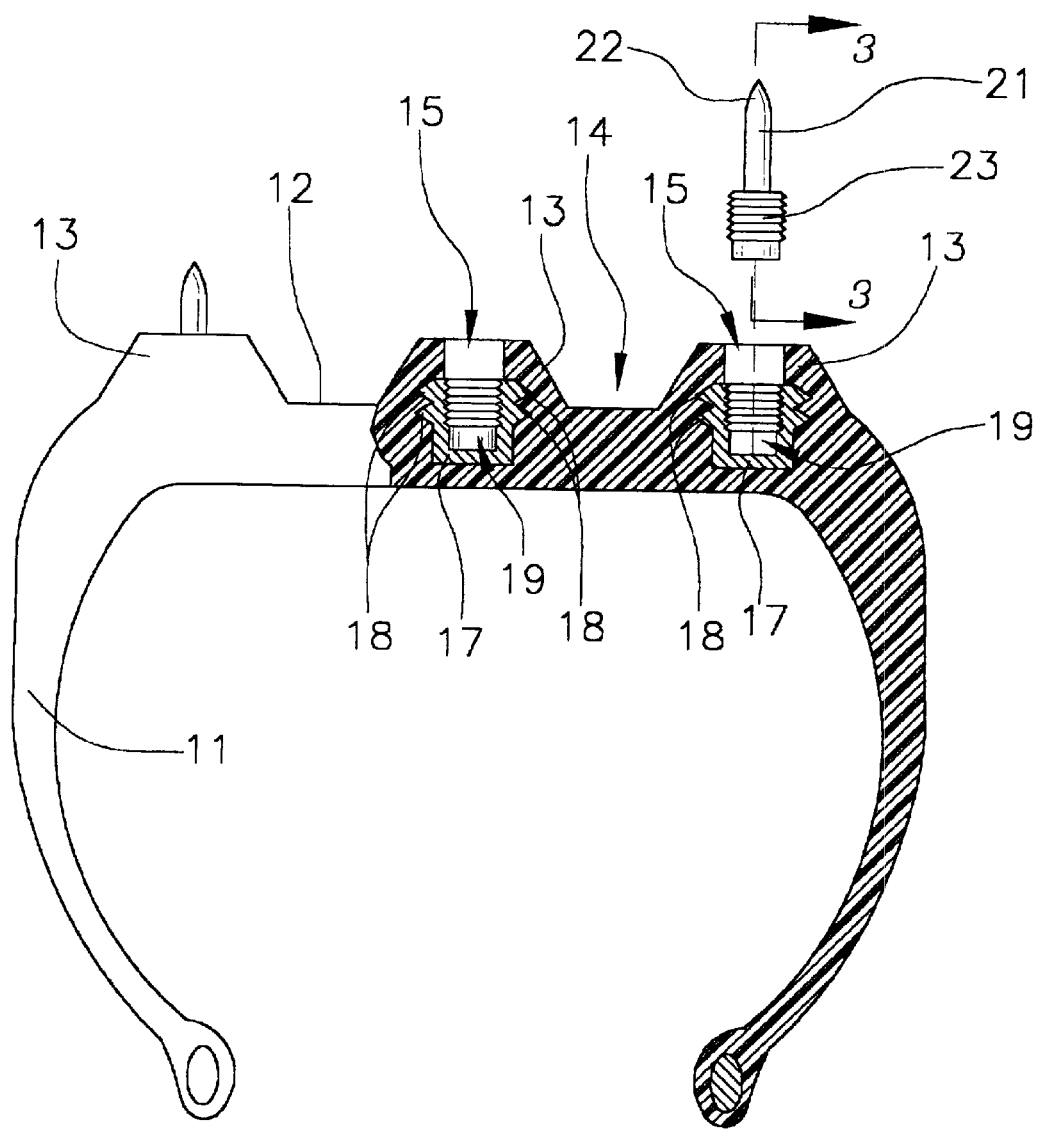
FIG. 2 is a cross-sectional view of the present invention.
Figure 3:
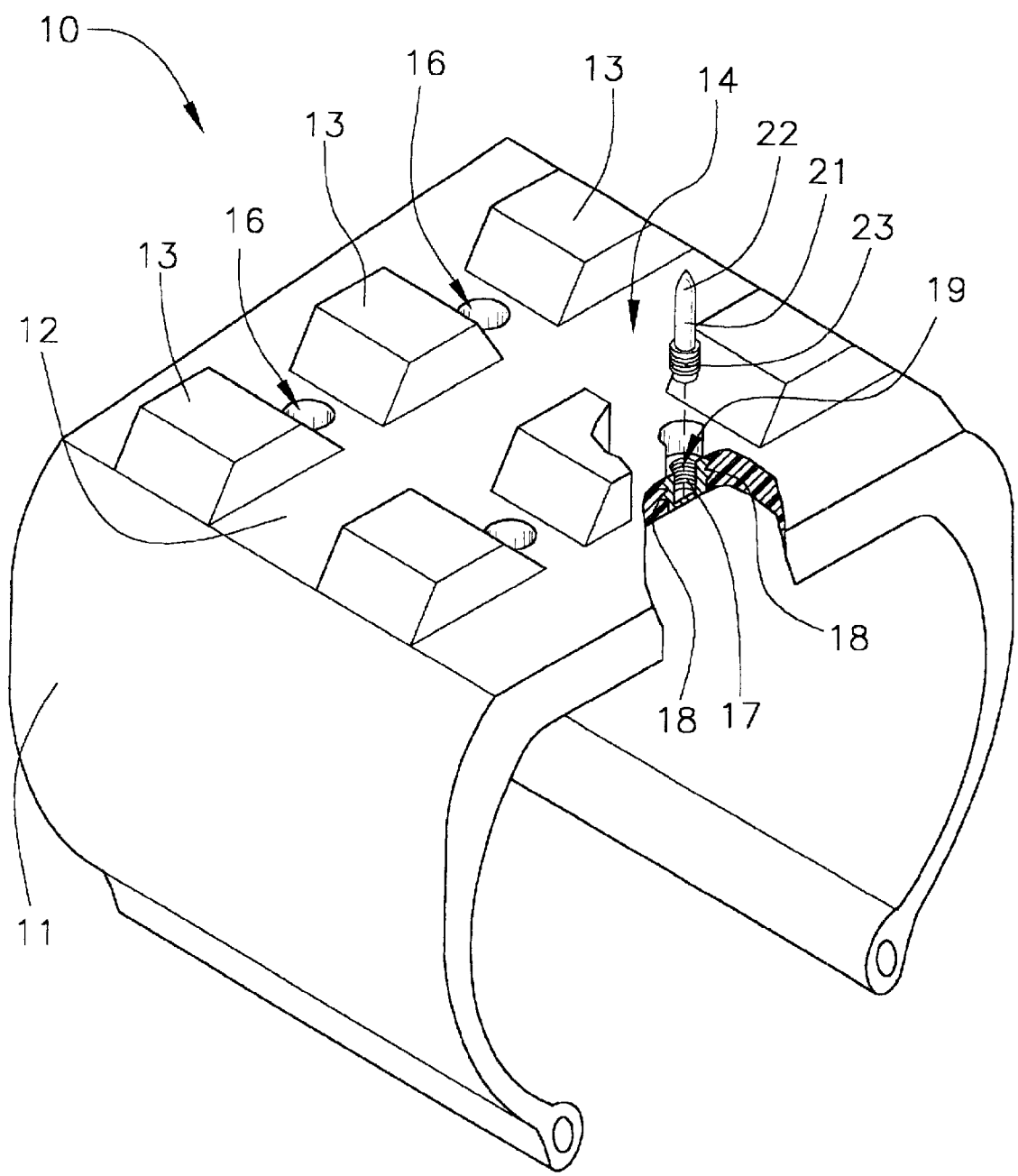
FIG. 3 is a perspective view of a second embodiment of the present invention.

With reference now to the drawings, and in particular to FIGS. 1 through 3 thereof, a new tire with removable studs embodying the principles and concepts of the present invention and generally designated by the reference numeral 10 will be described.

As best illustrated in FIGS. 1 through 3, the tire with removable studs 10 generally comprises a tire member 11 having an exterior circumferential surface 12 and further having a plurality of boss members 13 being spacedly and integrally disposed upon the exterior circumferential surface 12. The boss members 13 are arranged to form treads for the tire member 11. The boss members 13 are aligned to form rows and columns with channels 14 being formed upon the exterior circumferential surface 12 and being disposed between the boss members 13. Each of the boss members 13 is generally mesa-shaped and is tapered from a top to a bottom thereof. As a first embodiment, each of the boss members 13 also has a bore 15 extending therein through the top thereof. As a second embodiment, the tire member 11 further has bores 16 being disposed in the channels 14 thereof.

A plurality of stud-fastening members 17 are securely disposed in the bores 15,16 of the tire member 11. Each of the stud-fastening members 17 is cylindrically-shaped, and has threads 18 being conventionally disposed about an exterior of a side wall thereof and being adapted to grip side walls forming the bores 15,16 of the tire member 11, and also has a threaded bore 19 extending therein through an end thereof.

A plurality of stud members 21 are removably disposed in the bores 19 of the stud-fastening members 17 and are extended from the tire member 11 for gripping a road surface. Each of the stud members 21 has a parabolic end portion 22 and a threaded base portion 23.

In use, the user would use a tool to thread in and thread out the stud members 21 into the bores 19 of the stud-fastening members 17. The parabolic end portions 22 of the stud members 21 would protrude out from the bores 15,16 of the tire member 11 and would extend outwardly beyond the boss members 13 so that they would grip the road surface to prevent slippage of the tire members 11. The stud members 21 would be removed from the tire members 11 when not needed, and the tire members 11 would still be used for non-icy road surfaces.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the tire with removable studs. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An interchangeable stud/stud-less tire comprising:

a tire member having an exterior circumferential surface and further having a plurality of boss members being spacedly and integrally disposed upon said exterior circumferential surface, said boss members being arranged to form treads for said tire member, said boss members being aligned to form rows and columns with channels being formed upon said exterior circumferential surface and being disposed between said boss members, each of said boss members being generally mesa shaped and being tapered from a top to a bottom thereof; and a plurality of stud-fastening members being securely disposed in said tire member, each of said stud-fastening members being cylindrically-shaped, and having threads being disposed about an exterior of a side wall thereof, and also having a threaded bore extending therein through an end thereof; and a plurality of stud members being removably disposed in said stud-fastening members and being extended from said tire member for gripping a road surface.

2. An interchangeable stud/stud-less tire as described in claim 1, wherein each of said stud members has a parabolic end portion and a threaded base portion.

3. An interchangeable stud/stud-less tire as described in claim 2, wherein each of said boss members also has a bore extending therein through said top thereof, said stud-fastening members being securely disposed in said bores of said boss members with said threads of said stud-fastening members gripping side walls forming said bores of said boss members, stud members being securely and removably threaded in said stud-fastening members.

4. An interchangeable stud/stud-less tire as described in claim 2, wherein said tire member further has bores being disposed in said channels thereof, said stud-fastening members being securely disposed in said bores of said channels with said threads of said stud-fastening members gripping side walls forming said bores of said channels, stud members being securely and removably threaded in said stud-fastening members.

\* \* \* \* \*